UNITED STATES PATENT OFFICE.

JOHANN JAKOB BRACK, OF BASLE, SWITZERLAND, ASSIGNOR TO L. DURAND, HUGUENIN & CO., OF ST. FONS, FRANCE, BASLE, SWITZERLAND, AND HÜNINGEN, GERMANY.

POLYAZO YELLOWISH DYE.

SPECIFICATION forming part of Letters Patent No. 519,523, dated May 8, 1894.

Application filed January 17, 1894. Serial No. 497,164. (Specimens.) Patented in France December 2, 1892, No. 226,107, and March 13, 1893, No. 228,593; in England December 2, 1892, No. 9,182, and April 27, 1893, No. 8,511, and in Germany March 14, 1893, No. 71,377.

*To all whom it may concern:*

Be it known that I, JOHANN JAKOB BRACK, a citizen of the Swiss Republic, residing at Basle, Switzerland, have invented certain Improvements in the Manufacture of Polyazo Coloring-Matters, (for which patents have been granted in France, No. 226,107, dated December 2, 1892, and No. 228,593, dated March 13, 1893; in England, No. 9,182, dated December 2, 1892, and No. 8,511, dated April 27, 1893, and in Germany, No. 71,377, dated March 14, 1893,) of which the following is a specification.

This invention relates to the manufacture of certain polyazo-coloring matters varying in color from orange to red, and derived from dioxydiphenylmethane produced by the condensation of formic-aldehyde with ordinary phenol in the presence of a condensation agent, such, for instance, as hydrochloric acid. These coloring matters are produced by the combination of one molecule of dioxydiphenylmethane with two molecules of diazo-compounds, of which at least one is the intermediate product resulting from the combination of one molecule of naphthionic acid with one molecule of the tetrazo-derivative of a paradiamin, such, for example as benzidin, tolidin, tolidin-formaldehyde (which latter is the product of the condensation of formic-aldehyde with tolidin) dianisidin, dianisidin formaldehyde (condensation product of formic-aldehyde with dianisidin), &c.

The two molecules of diazo-compounds may be of the same or different constitution, or one may be a simple diazo-compound, such, for example, as the chlorid of diazo-benzene, diazo-benzene-sulfonic acid, diazo-naphthalene-sulfonic acid, the chlorid of diazo-naphthalene, &c.

I attribute to the coloring matters prepared from one molecule of dioxydiphenylmethane and two molecules of the intermediate product resulting from the union of equivalent quantities of tetrazo-diphenyl and naphthionic acid, the following formula:

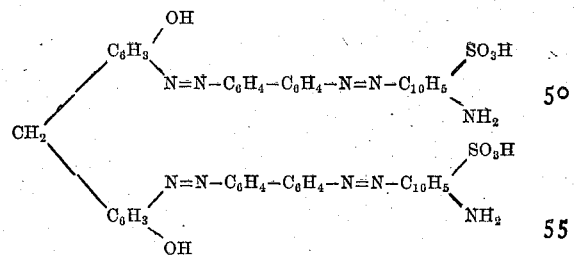

and to the product resulting from the reaction of one molecule of chlorid of diazo-naphthalene with one molecule of dioxydiphenylmethane and one molecule of the product resulting from the union of equivalent quantities of tetrazodiphenyl and naphthionic acid, I attribute the following formula:

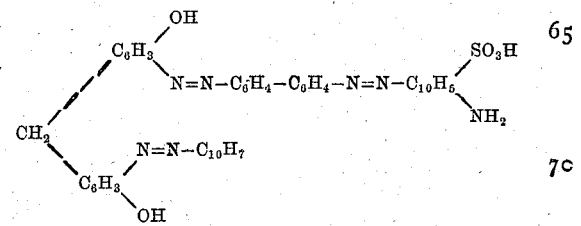

I will now proceed with a more detailed description of the manner of preparing the coloring matters of which the compounds whose formula are given above are types.

I. *Coloring matter produced by the combination of one molecule of dioxydiphenylmethane with two molecules of the intermediate product resulting from the union of equivalent quantities of tetrazo-ditolyl and naphthionic acid.*—21.2 kilos of tolidin are diazotized in the usual way by means of 13.8 kilos of sodium nitrite and sixty kilos of hydrochloric acid at 21° Baumé. The tetrazo-compound thus obtained is poured into a solution of 24.5 kilos of naphthionate of soda and forty kilos of sodium acetate in five hundred liters of water, care being taken to thoroughly agitate. The intermediate product obtained after two or three hours is introduced into a solution of ten kilos of dioxydiphenylmethane, 3.5 kilos of caustic soda and fifty kilos of sodium carbonate in five hundred liters of water. The mass is now left to stand for a short time after which it is heated to ebullition and the coloring matter is precipitated by the addition of sea salt. The coloring matter thus produced when dried is in the form of a brown powder possessing a bronze luster, readily soluble in hot water, and gives, when dissolved in concentrated sulfuric acid, a blue coloration.

II. *Coloring matter produced by the combination of one molecule of dioxydiphenylmethane with two molecules of the intermediate product resulting from the union of equivalent quantities of naphthionic acid and tetrazodiphenyl.*—For the 21.2 kilos of tolidin employed in the preceding example, 18.4 kilos of benzidin are substituted. The coloring matter thus produced, when dried, is in the form of a deep brown powder possessing a bronze luster, readily soluble in hot water and imparting to its solution in concentrated sulfuric acid a blue color.

III. *Coloring matter produced by the combination of one molecule of dioxydiphenylmethane, one molecule of the intermediate product resulting from the union of tetrazoditolyl with naphthionic acid and one molecule of the intermediate product resulting from the union of tetrazodiphenol methyl ether and naphthionic acid.*—I first prepare the product resulting from the combination of one molecule of dioxydiphenylmethane with one molecule of the product resulting from the union of tetrazoditolyl with naphthionic acid by means of 21.2 kilos of tolidin, sixty kilos of hydrochloric acid 21° Baumé, 13.8 kilos of sodium nitrite, 24.5 kilos of naphthionate of soda, forty kilos of sodium acetate, twenty kilos of dioxydiphenylmethane, seven kilos of caustic soda and forty kilos of sodium carbonate. The mass is now left to stand for a suitable time, after which these are added to it first forty kilos of sodium carbonate and then the intermediate product resulting from the union of tetrazodiphenolmethyl-ether with naphthionic acid obtained by the union of 24.4 kilos of dianisidin, sixty kilos of hydrochloric acid at 21° Baumé, 13.8 kilos of sodium nitrite, 24.5 kilos of sodium naphthionate and forty kilos of sodium acetate. After a short time the whole is heated to ebullition and the coloring matter is precipitated by the addition of sea salt, forming, when dried, a deep brown powder. This coloring matter imparts to its solution in concentrated sulfuric acid a blue color.

IV. *Coloring matter produced by the combination of one molecule of dioxydiphenylmethane with one molecule of the intermediate product resulting from the union of tetrazoditolyl with naphthionic acid and one molecule of the chlorid of diazonaphthalene.*— To the product resulting from the union of tetrazoditolyl with naphthionic acid and dioxydiphenylmethane is added first forty kilos of sodium carbonate and then a solution of the chlorid of diazo-naphthalene obtained by the union of 14.3 of alphanaphthylamin, thirty kilos of hydrochloric acid and 6.9 kilos of sodium nitrite. After the reaction has been maintained for several hours at an ordinary temperature it is terminated by an increased temperature of about 60° to 70° centigrade, after which the coloring matter is precipitated by the addition of sea salt. When dried, the coloring matter thus produced is a deep brown powder readily soluble in hot water and imparting to its solution in concentrated sulfuric acid a blue coloration.

V. *Coloring matter produced by the combination with one molecule of the alpha-diazonaphthalene-sulfonic acid, one molecule of dioxydiphenylmethane and one molecule of the intermediate product resulting from the union of tetrazoditolyl with naphthionic acid.*— For the 14.3 kilos of alpha-naphthylamin employed in the preceding example 24.5 kilos of sodium naphthionate is substituted. The coloring matter thus produced is a deep brown powder readily soluble in hot water and imparting a blue color to its solution in concentrated sulfuric acid.

VI. *Coloring matter produced by the combination with one molecule of dioxydiphenylmethane of two molecules of the intermediate product resulting from the union of one molecule of alpha-naphthionic acid with one molecule of the tetrazo-derivative of the product of condensation of tolidin with formaldehyde.*— The tetrazo-derivative prepared by diazotizing 21.8 kilos of tolidin-formaldehyde or the condensation product of tolidin with formicaldehyde through the medium of forty kilos of hydrochloric acid at 21° Baumé and seven kilos of nitrite of soda is poured into a solution of 12.3 kilos of naphthionate of soda and twenty kilos of acetate of soda in about three hundred liters of water. After about three hours, the intermediate product thus produced, which is in the form of a deep brown precipitate, is introduced into a solution containing five kilos of dioxydiphenylmethane, five kilos of caustic soda and forty kilos of carbonate of soda in about two hundred liters of water. After some hours of reaction at an ordinary temperature, the mass is heated to a temperature of from 60° to 70° centigrade, to complete the combination, and is filtered. The coloring matter thus produced is, when dried, a bright red powder soluble in hot water, and when dissolved in concentrated sulfuric acid gives a red violet color.

VII. *Coloring matter produced by the combination of one molecule of dioxydiphenyl-*

*methane with two molecules of the intermediate product resulting from the union of one molecule of naphthionic acid with one molecule of the tetrazo-derivative of the condensation of dianisidin with formic aldehyde.*—For the 21.8 kilos of tolidin-formaldehyde employed in Example VI is substituted twenty-five kilos of dianisidin-formaldehyde or the condensation product of dianisidin with formic-aldehyde. The coloring matter produced in this manner when dried is a greenish brown powder having a metallic luster, soluble in water and imparting to its solution in concentrated sulfuric acid a blue violet coloration.

When prepared as above described these new polyazo-coloring matters are in the form of a powder of a reddish or brownish color when dried and are characterized by their property of dyeing unmordanted cotton in an alkaline bath a yellowish, orange or reddish color.

Having thus described my invention, I claim—

1. The herein described process of manufacturing polyazo-coloring matters varying in color from red to orange, which consists in combining one molecule of dioxydiphenylmethane with two molecules of diazo-compounds of which compounds one at least is the intermediate product resulting from the union of one molecule of naphthionic acid and one molecule of the tetrazo-derivative of a paradiamido-base such, for instance, as benzidin, tolidin, tolidin,-formaldehyde, dianisidin or dianisidin-formaldehyde, substantially as set forth.

2. The herein described process of manufacturing polyazo-coloring matters varying in color from red to orange, which consists in combining one molecule of dioxydiphenylmethane with two molecules of the intermediate product resulting from the union of a molecule of naphthionic acid with a molecule of the tetrazo-derivative of a paradiamido-base, such, for instance, as benzadin, tolidin, tolidin-formaldehyde, dianisidin, or dianisidin-formaldehyde, substantially as set forth.

3. The herein described polyazoic coloring matter prepared from dioxydiphenylmethane tetrazoditolyl and naphthionic acid, which dyes unmordanted cotton a yellowish red color in an alkaline bath, said coloring matter when dry being a brown powder, soluble in water and dissolving in concentrated sulfuric acid with a blue coloration, substantially as set forth.

In witness whereof I have hereunto signed my name in the presence of two subscribing witnesses.

JOHANN JAKOB BRACK.

Witnesses:
GEORGE GIFFORD,
AMAND RITTER.